Nov. 3, 1970 CHANG K. CHU 3,538,401

DRIFT FIELD THYRISTOR

Filed April 11, 1968 4 Sheets-Sheet 1

WITNESSES:

Helen M. Farkas

Donald M. Winegar

INVENTOR

Chang K. Chu

BY

C. L. Menzemer

ATTORNEY

Nov. 3, 1970 CHANG K. CHU 3,538,401

DRIFT FIELD THYRISTOR

Filed April 11, 1968 4 Sheets-Sheet 2

Nov. 3, 1970 CHANG K. CHU 3,538,401

DRIFT FIELD THYRISTOR

Filed April 11, 1968 4 Sheets-Sheet 3

DRIFT FIELD THYRISTOR

Filed April 11, 1968 4 Sheets-Sheet 4

United States Patent Office 3,538,401
Patented Nov. 3, 1970

3,538,401
DRIFT FIELD THYRISTOR

Chang K. Chu, Pittsburgh, Pa., assignor to Westinghouse Electric Corporation, Pittsburgh, Pa., a corporation of Pennsylvania Filed Apr. 11, 1968, Ser. No. 720,667
Int. Cl. H01l 11/10
U.S. Cl. 317—235 23 Claims

ABSTRACT OF THE DISCLOSURE

Epitaxial growth techniques are employed to manufacture a variety of drift field thyristors which exhibit the desirable properties of both all diffused and alloy-diffused thyristor devices. One, or more, epitaxial layers of a particular type conductivity is applied to a processed body of semiconductor material to retard the electron flow in a forward direction while accelerating the electron flow in the reverse direction. Two epitaxial layers of the same type, but different levels of impurity concentration may be grown on a body of semiconductor material to create a retarded electrical field. Additionally, the epitaxial layers may be applied in various combinations to the same wafer to achieve different end results.

BACKGROUND OF THE INVENTION

Field of the invention

This invention relates to semiconductor devices and methods of producing the same. In particular, this invention pertains to novel structures for thyristor semiconductor devices.

Description of the prior art

Heretofore, the thyristor semiconductor devices were made by either of two methods. In one method of manufacture all of the various regions of different type semiconductivities and various levels of impurity concentration are formed by diffusion processes. In the second method, some of the various regions are formed by alloying and the remainder by diffusion. However, besides a large percentage of rejects during manufacture, none of the devices are capable of having all of the desirable features of a high $V_{BO}V_R$ rating, a low forward voltage drop, a low gate current, a high *dv/dt* rating, a low turn-on time, and a short turn-off time.

SUMMARY OF THE INVENTION

In accordance with the teachings of this invention there is provided a semiconductor controlled rectifier comprising four semiconductive regions of alternate semiconductivity type with p-n junctions therebetween including, in sequence, a first emitter region, a first base region, a second base region, and a second emitter region; ohmic contacts affixed to said first emitter, said first base, and said second emitter regions; and means for providing an integral negative electrical field formed in at least one of said first base and said second base regions.

An object of this invention is to increase the acceptance level of device quality semiconductor devices suitable for use as thyristor units.

Another object of this invention is to provide a semiconductor device suitable for employment as a thyristor unit wherein the device embodies the most desirable features of both an all diffused thyristor unit and an alloyed diffused thyristor unit.

Another object of this invention is to provide a semiconductor device suitable for employment as a thyristor unit wherein the device has a high $V_{BO}V_R$ rating, a law forward voltage drop, a low gate current, a high *dv/dt* rating, a low turn-on time and a short turn-off time.

Other objects of this invention will, in part, be obvious and will, in part, appear hereinafter.

DRAWINGS

In order to more fully understand the nature and objects of the invention reference should be had to the following drawings in which.

DESCRIPTION OF THE INVENTION

In order to more fully describe the invention, and for no other purpose, the process of making various drift field thyristors from n-type semiconductivity silicon semiconductor material will be described.

Figure 1:
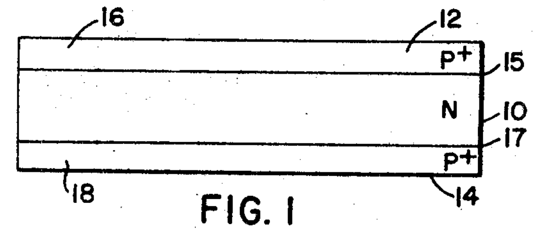
FIGS. 1 through 4 are views, partly in cross-section of a body of semiconductor material being processed in accordance with the teachings of this invention.

With reference to FIG. 1, a body 10 of n-type semiconductivity silicon semiconductor material is prepared by standard lapping and polishing techniques for a diffusion process. The body 10 has a resistivity of from 15 to 200 ohm-centimeter and a preferred resistivity of 120 ohm-centimeter. The body 10 has two major opposed surfaces 12 and 14 which are called respectively the top surface and the bottom surface.

A simultaneous double diffusion is performed to form regions 16 and 18 of $p^+$-type semiconductivity in the body 10. The region 16 includes the top surface 12 and the region 18 includes the bottom surface 14 of the body 10. Each of the regions 16 and 18 is from 2 to 4 mils in depth and has a surface concentration, after diffusion, of approximately $10^{18}$ atoms/cc. Each region 16 and 18 preferably is 3.5 mil in thickness. Aluminum and gallium are suitable dopant materials for forming the regions 16 and 18.

P–N junctions 15 and 17 are formed respectively between region 16 and the body 10 and region 18 and the body 10.

Figure 2:
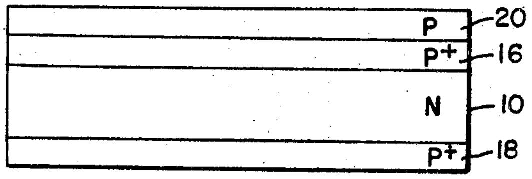

Referring now to FIG. 2, the diffused body 10 is placed in an epitaxial material growing apparatus. Employing hydrogen chloride gas, approximately one-half mil thickness of the region 16 is removed. A region 20 of p-type semiconductor material is epitaxial grown on the top surface 12 of the remainder of the region 16. The region 20 is from 2 to 10 microns in thickness, the preferred thickness being 5 microns. The material comprising the region 20 has a resistivity of less than 12 ohm-centimeter and preferably never exceeds 10 ohm-centimeter. The layer 20 has a surface concentration of approximately $2.5\times10^{15}$ atoms per cubic centimeter.

Next, a region 22 of $n^+$ type semiconductor material is epitaxially grown on the region 20 of p-type semiconductor material. The region 22 is from 5 to 20 microns in thickness. The preferred thickness is from 10 to 12 microns in thickness. The region 22 has a surface concentration greater than $10^{19}$ atoms per cubic centimeter. The region 22 may also be formed by an appropriate diffusion process practiced on an epitaxial region of semiconductor material grown on the region 20. A p–n junction 24 is formed at the interface of the regions 20 and 22.

Utilizing photolithographic techniques followed by chemical etching, a portion of the materials comprising each of the regions 22, 20 and 16 is removed until a portion of the region 16 is exposed. Electrical contacts 26, 28 and 30 each preferably made of aluminum, are deposited on selective surface areas of regions 16, 22 and 18 respectively. The resulting structure is shown in FIG. 3.

Figure 4:
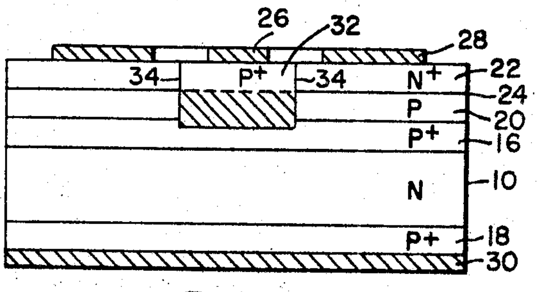

With reference to FIG. 4 there is shown an alternate method of processing the body 10 of semiconductor material. In this process all process steps are the same as before except the electrical contact 26 is electrically connected to the region 26 by an alloying process. The alloying process forms a region 32 of $p^+$ semiconductivity which extends from the top surface of the region 22 through the region 20 preferably into a portion of the region 16 to assure a good electrical contact between region 16 and the contact 26. A p–n junction 34 is formed by the coextensive surfaces of regions 32, 20, and 22, the remainder of the region 32 being recrystallized p-type semiconductor material.

Figure 3:
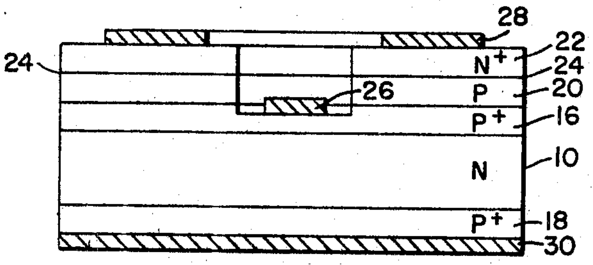
Figure 5:
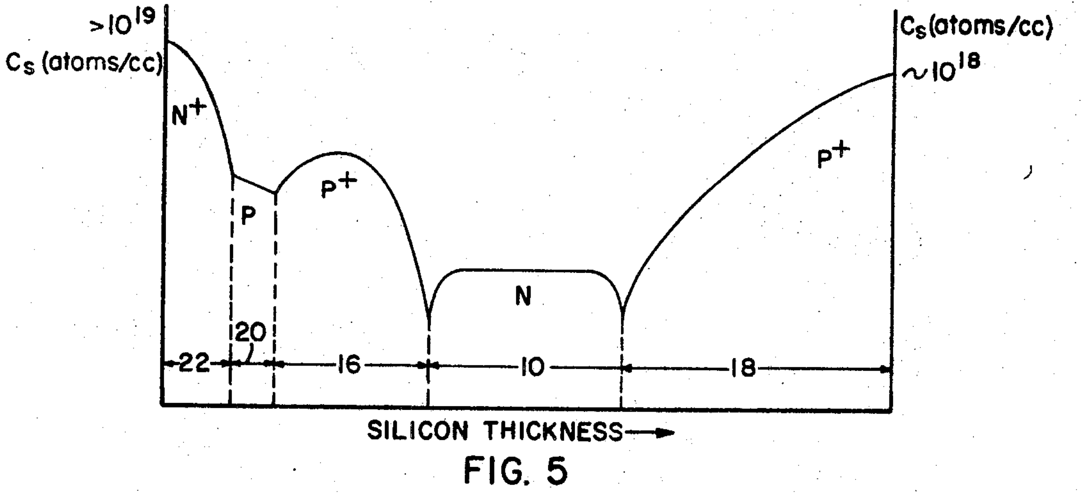
FIG. 5 is an impurity concentration profile of the body of semiconductor material of FIGS. 3 and 4.

With reference to FIG. 5 there is shown an impurity concentration profile for the basic structure of the processed body shown in either FIG. 3 or FIG. 4. The body 10 shows a uniform impurity concentration which decreases at each surface because of the effect of the diffusion process producing regions 16 and 18. Region 18 has an impurity profile which shows an increasing impurity concentration to a maximum of an approximate surface concentration of $10^{18}$ atoms per cubic centimeter. The impurity profile for the region 16 has a maximum less than that of region 18 because of the effect of the epitaxial growing of region 20. Region 20 has an impurity profile which shows a non-uniformity impurity concentration. Region 22 has an impurity concentration profile showing an increasing impurity concentration of the region 22 wherein the surface concentration exceeds $10^{19}$ atoms per cubic centimeter.

During normal operation of the processed body 10, the electron flow is in through region 22 and out through region 18. The region 16 with its initial increasing impurity concentration retards the flow of the electrons through the region 16 and into the region 10. In a similar manner, when the electron flow is reversed, region 16 accelerates the electron flow. The resultant structure combines the best features obtainable separately by an all diffused body of semiconductor material and an alloy diffused body of semiconductor material. The processed body 10 has a $V_{BO}V_R$, or 2000 volts which can be as high as an all diffused unit and which is greater than the rating of an alloy diffused unit. The $V_F$, or forward voltage drop, is lower than that of the alloy diffused unit. The $I_G$, or gate current, of the processed body 10 is low, like the all diffused unit, whereas the alloy diffused unit has a high gate current.

In addition, the processed body 10 has a *dv/dt* rating of 500 volts per microsecond which is high like an all diffused unit whereas an alloy diffused unit has a low *dv/dt* rating. The turn-off time, $T_{OFF}$, of the processed body 10 is short, whereas the rating for the all diffused unit is medium.

It is readily seen therefore that the proposed body 10 has all the desirable features of both the all diffused and the alloy diffused units but none of their limitations.

The desirable features of the processed body 10 may also be achieved in a different processing manner. With reference to FIGS. 6 through 11 there is shown a body of semiconductor material being processed by alternate process steps into a thyristor unit 50.

Figure 6:
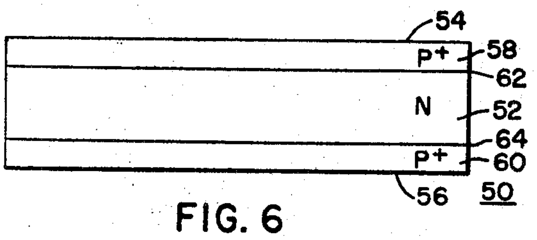
FIGS. 6 through 11 are views, partly in cross-section of a body of semiconductor material being processed in accordance with the teachings of this invention.

With reference to FIG. 6 the thyristor unit 50 comprises a body 52 of n-type semiconductivity silicon semiconductor material is prepared by standard lapping and polishing techniques for a diffusion process. The resistivity of the body 52 is dependent upon the voltage applications for the unit 50 in its end use. For example, if the end use of the unit 50 requires a design voltage of 1500 volts, the resistivity of the body 52 is approximately 50 ohm-centimeter. The body 52 has two major opposed surfaces 54 and 56 which are respectively the top surface and the bottom surface.

A simultaneous double diffusion is performed to form regions 58 and 60 of $p^+$-type semiconductivity in the body 52. The region 58 includes the top surface 54 and the region 60 includes the bottom surface 56 of the body 52. Alternately each of the regions 58 and 60 may be formed by growing suitably doped epitaxial semiconductor material on the respective surfaces 54 and 56.

Each of the regions 58 and 60 is from 2 to 4 mils in thickness and has a surface concentration of approximately $10^{18}$ atoms per cubic centimeter. A preferable thickness for each region 58 and 60 after processing is 3.5 mils. A p–n junction 62 is formed at the interface between region 58 and the body 52 and a p–n junction 64 is formed at the interface between region 60 and the body 52.

Figure 7:
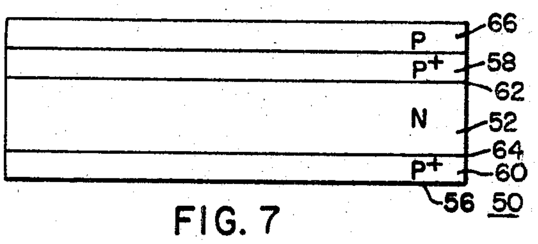

Referring now to FIG. 7, approximately one-half mil thickness of the region 58 is chemically etched away in a suitable apparatus. A region 66 of $p^+$-type semiconductivity material is grown on the surface of the remaining region 58. The region 66 is from 2 to 5 microns in thickness. The region 66 has a graded impurity structure wherein the impurity concentration uniformly increases until the concentration at its surface is from $8\times10^{15}$ atoms per cubic centimeter to $10^{19}$ atoms per cubic centimeter.

Figure 8:
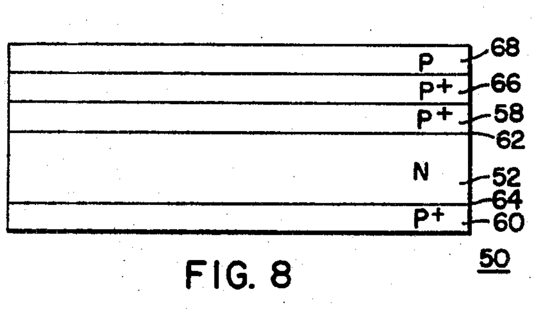

With reference to FIG. 8 a region 68 of p-type semiconductivity material is epitaxially grown on the region 66. The region 68 is from 2 to 10 microns in thickness, preferably being 5 microns. The resistivity of the region 68 preferably never exceeds 10 ohm-centimeter. The layer 66 has a uniform decreasing graded impurity concentration which has a surface concentration of approximately $2.5\times10^{15}$ atoms per cubic centimeter.

Figure 9:
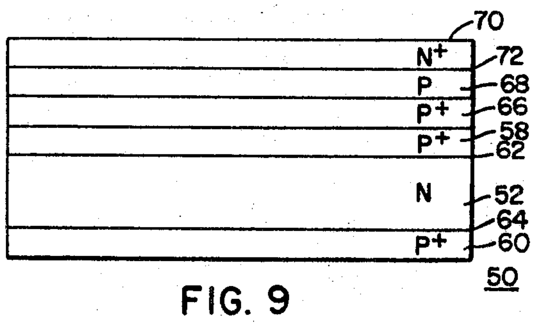

Referring now to FIG. 9 a region 70 of $n^+$-type semiconductivity is epitaxially grown on the region 68. The region 70 is from 2 to 15 microns in thickness, preferably being from 10 to 15 microns in thickness. The region 70 has an increasing graded level of impurity concentration which reaches a value greater than $10^{19}$ atoms per cubic centimeter for its surface concentration.

The region 70 may also be formed by a diffusion process. In this instance the previous layer 68 has an increasingly appropriate thickness equal to the thickness of the diffused region 70.

A p-n junction 72 is formed by the coextensive surfaces of the regions 68 and 70.

Figure 10:
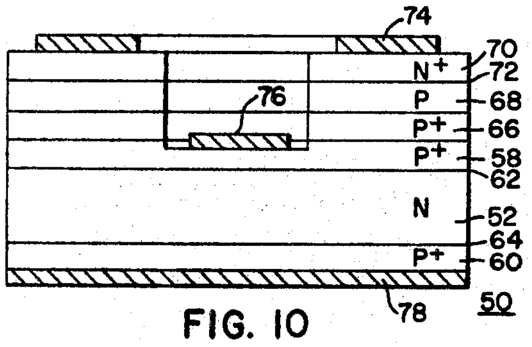

With reference to FIG. 10 electrical contacts 74, 76, and 78 are affixed to the device 50 in either of the previously described methods for the processed body 10. Employing suitable process techniques, such for example, as photolithographic techniques in conjunction with selective etching, a portion of each of the regions 58, 66, 68 and 70 is removed and the electrical contact 76 is affixed directly to region 58. The other electrical contacts 74 and 78 are affixed to the respective regions 70 and 60.

Figure 11:
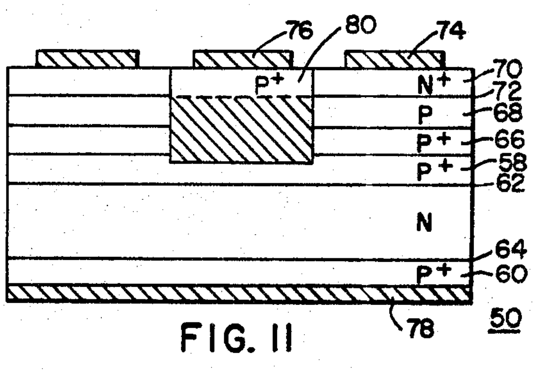

Alternately, as shown in FIG. 11, the electrical contact 76 is electrically connected to region 58 by a region 80 of p-type material formed by such suitable means as alloying. The region 80 extends through regions 70, 68, 66 and into region 58.

Figure 12:
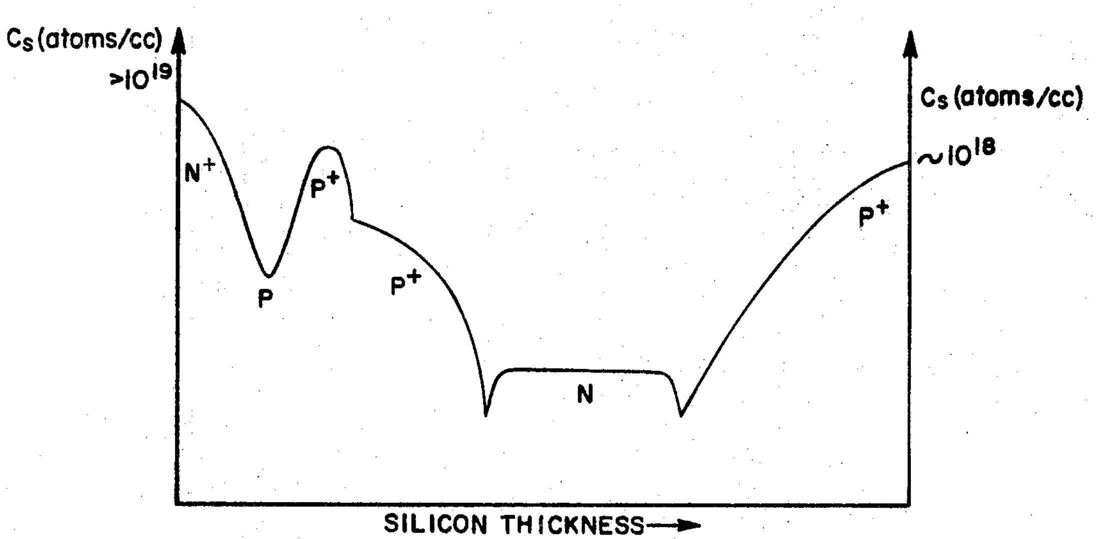
FIG. 12 is an impurity concentration profile of the body of semiconductor material of FIG. 9.
Figure 13:
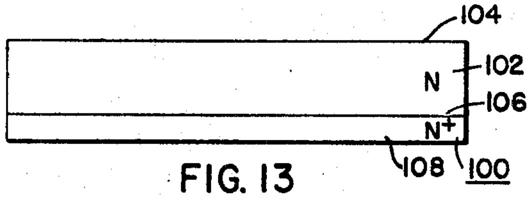
FIGS. 13 through 18 are views, partly in cross-section, of a body of semiconductor material being processed in accordance with the teachings of this invention.

The impurity concentration profile of the completed device 50 is shown in FIG. 12. The additional $p^+$-type semiconductor region of the region 66 enables the device 50 to have a different electrical field distribution than the processed body 10. The additional $P^+$ region 66 affects the injected electron movement in the $p^+$ base by diffusion.

A further modification of the processed body 10 which achieves the desirable operating characteristics for a thyristor unit is shown in FIGS. 13 through 18 which depict a body of semiconductor material being processed into a thyristor unit 100. With reference to FIG. 11 the unit 100 comprises a body 102 of n-type semiconductivity silicon semiconductor material prepared by standard lapping and polishing techniques for an epitaxial growth process. The resistivity of the body 102 is dependent upon the voltage applications for the unit 100 in its end use. The body 102 has two major opposed surfaces 104 and 106 which are respectively the top surface and the bottom surface.

A region 108 of $n^+$-type semiconductivity semiconductor material is grown on the bottom surface 106 of the body 102. The region 108 has a thickness and an impurity concentration which is dependent upon the end use of the device 102. For example, the region 108 should be from 2 to 10 microns in thickness and have a resistivity of from 5 to 70 ohm-cm. for a device 100 having a rating of 1800 volts. However, the region 108 does have an impurity surface concentration less than $10^{15}$ atoms per cubic centimeter and preferably less than $10^{14}$ atoms per cubic centimeter.

Figure 14:
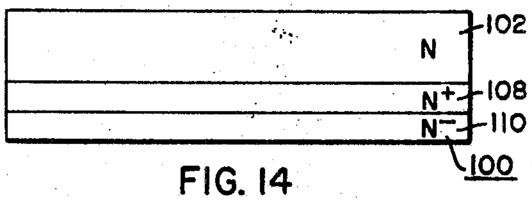

Referring now to FIG. 14 a region 110 $n^-$-type semiconductivity semiconductor material is epitaxially grown on the region 108. The thickness of the region 110 is initially thick enough to allow for a subsequent diffusion process and to provide a remaining region ranging from 2 to 10 microns in thickness. Preferably the region 110 after the subsequent diffusion process is 5 microns in thickness. The region 110 preferably has a surface impurity concentration of approximately $10^{13}$ atoms per cubic centimeter after the subsequent diffusion process.

The function of the regions 108 and 110 is to form a retarded electric field, that is it acts to retard hole injection.

Figure 15:
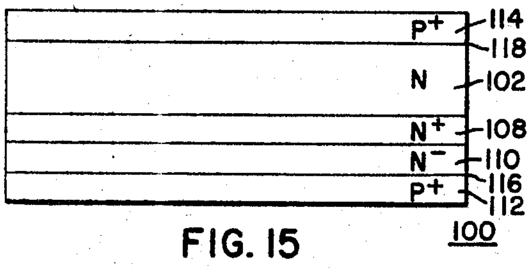

In reference to FIG. 15, a simultaneous double diffusion process forms $p^+$-type semiconductivity regions 112 and 114 in the processed body 102. The regions 112 and 114 are each 2 to 3 mils in thickness and have an impurity surface concentration of approximately $10^{18}$ atoms per cubic centimeter. P-n junctions 116 and 118 are formed at the interface of the respective regions 110 and 112, and 102 and 114.

Figure 16:
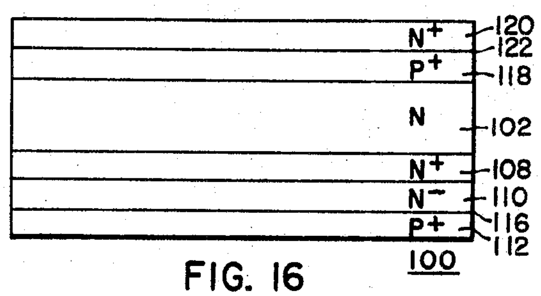

Referring now to FIG. 16 a region 120 of $n^+$-type semiconductivity is formed on the region 114 by either an epitaxial growth process or a diffusion process. The region 120 has a surface impurity concentration of greater than $10^{19}$ atoms per cubic centimeter and is from 10 to 15 microns in thickness. A p-n junction 122 is formed by the coextensive surfaces of regions 118 and 120.

Figure 17:
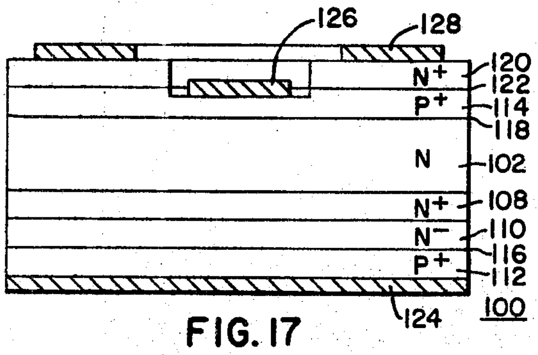
Figure 18:
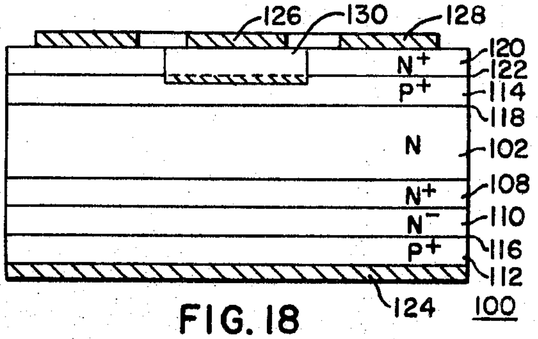

Electrical contacts 124, 126 and 128 are affixed to regions 112, 118 and 120 respectively in the same manner as heretofore described in the previous teachings of this invention relative to the processing of the body 10. The contacts 124, 126 and 128 are either affixed directly to the respective regions as shown in FIG. 17 or they may be affixed as shown in FIG. 18 wherein electrical contact 126 is in an electrically conductive relationship with region 114 through a region 130 of P-type semiconductivity. The region 130 is formed by such suitable means as alloying. The region 130 extends from the top surface of region 120 through, the region 120, and preferably into a portion of region 114.

Figure 19:
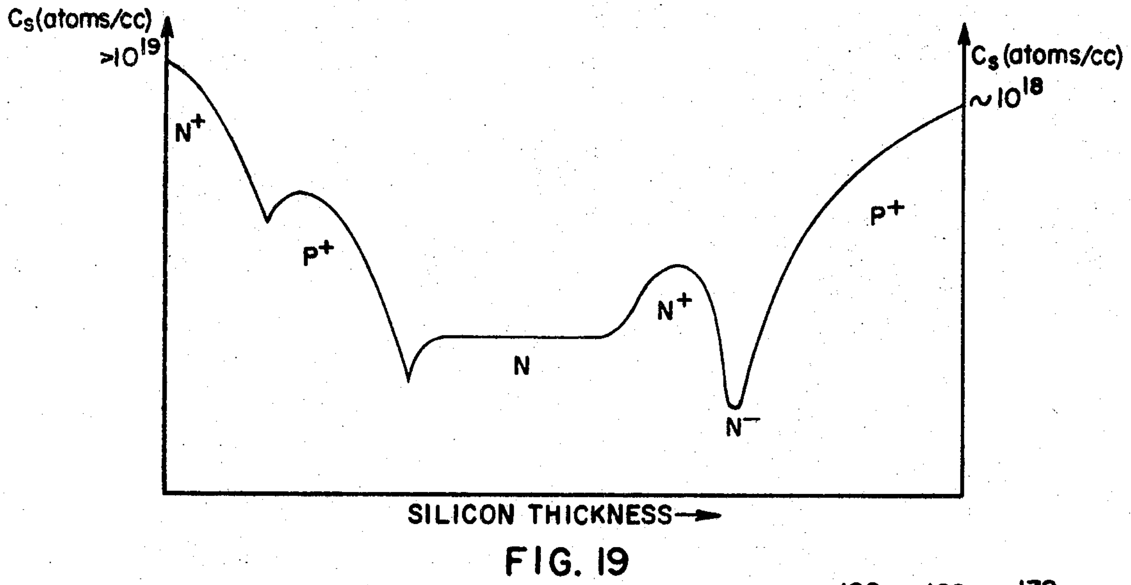
FIG. 19 is an impurity concentration profile of the body of semiconductor material of FIG. 18.

The impurity concentration profile of the completed device 100 is shown in FIG. 19.

Figure 20:
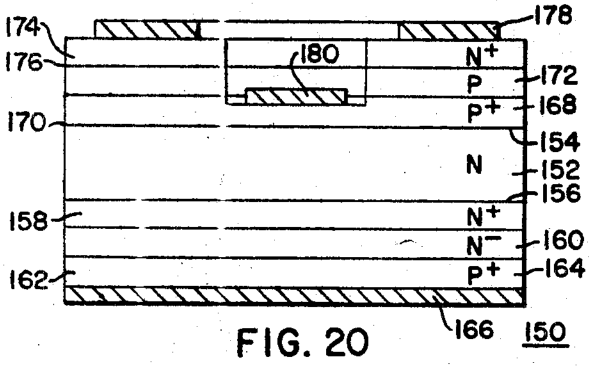
FIG. 20 is a view, partly in cross-section of a semiconductor device made in accordance with the teachings of this invention.

With reference to FIG. 20 there is shown a semiconductor device 150 suitable for use in a thyristor unit which combines the desirable properties of the processed body 10 and the semiconductor device 50.

The device 150 comprises a body 152 of n-type semiconductivity semiconductor material. The resistivity and the dimensions of the body 152 are dependent upon the end use voltage rating of the device 150. The body 152 has a top surface 154 and a bottom surface 156 which constitute two major opposed surfaces. A region 158 of $n^+$-type semiconductivity semiconductor material is disposed on the bottom surface 156 of the body 152. The region 158 has the same dimensions and the same electrical properties as the region 108 of the device 100. An epitaxially grown region 160 of n-type semiconductivity semiconductor material is disposed on the region 158. The region 160 has the same dimensions and the same electrical properties as the region 110 of the device 100. The regions 108 and 110 form a retarded electrical field in the device 150.

A region 162 of $p^+$-type semiconductivity semiconductor material is formed on the region 160, the interface of the regions 160 and 162 forming a p-n junction 164. The dimensions and the electrical characteristics of the region 162 are the same as those of the region 112 of the device 100. An electrical contact 166, preferably comprising aluminum, is affixed to the region 162.

Formed on the top surface 154 of the body 152 is region 168 of $p^+$-type semiconductivity semiconductor material. The region 168 has the same dimensions and the same electrical properties as the region 16 of the processed body 10. The region 168 is the base region of the device 150. A p-n junction 170 is formed by the interface of the two regions 168 and 152.

An epitaxially grown region 172 of p-type semiconductivity semiconductor material is disposed on the region 168. The dimensions and the electrical characteristics of the region 172 is the same as those of the region 20 of the processed body 10. The function of the region 172 is to retard the electron flow through that portion of the device 150 during normal operations and to accelerate the electron flow in the reverse direction.

A region 174 of $n^+$-type semiconductivity is formed on the region 172. The dimensions and the electrical characteristics of the region 172 are the same as the region 22 of the processed body 10. A p-n junction 176 is formed by the coextensive surfaces of the regions 172 and 174. Electrical contacts 178 and 180 are affixed to the respective regions 174 and 168.

Figure 21:
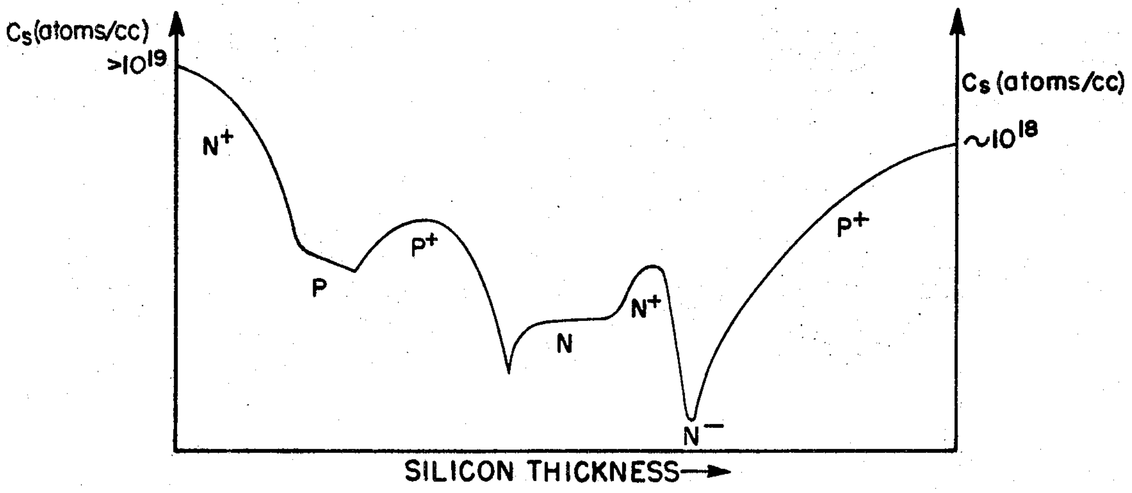
FIG. 21 is an impurity concentration profile of the body of semiconductor material comprising the device of FIG. 20.

The impurity concentration profile of the semiconductor device 150 is shown in FIG. 21.

Figure 22:
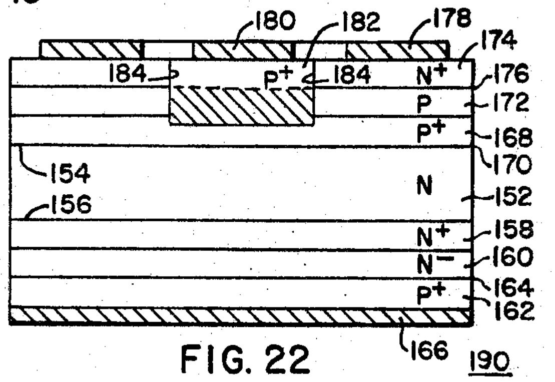
FIG. 22 is a view, partly in cross-section of an alternate configuration of the semiconductor device of FIG. 20.

Alternately, the semiconductor device 150 may be modified by electrically connecting the electrical contact 180 to the region 168 by an alloying process which creates a region 182 of $p^+$ semiconductivity which extends through region 174, region 172 and partly into the region 168. A p-n junction 184 is formed by the interface of region 182 and regions 174, the dash and line defining the recrystallized portion of region 182 in regions 168 and 172. The resulting structure semiconductor device 190, which is the modification of the device 150 and it is shown in FIG. 22. The impurity concentration profile of the semiconductor device 180 is the same as that for the device 150 and is shown in FIG. 21.

Figures 23, 24:
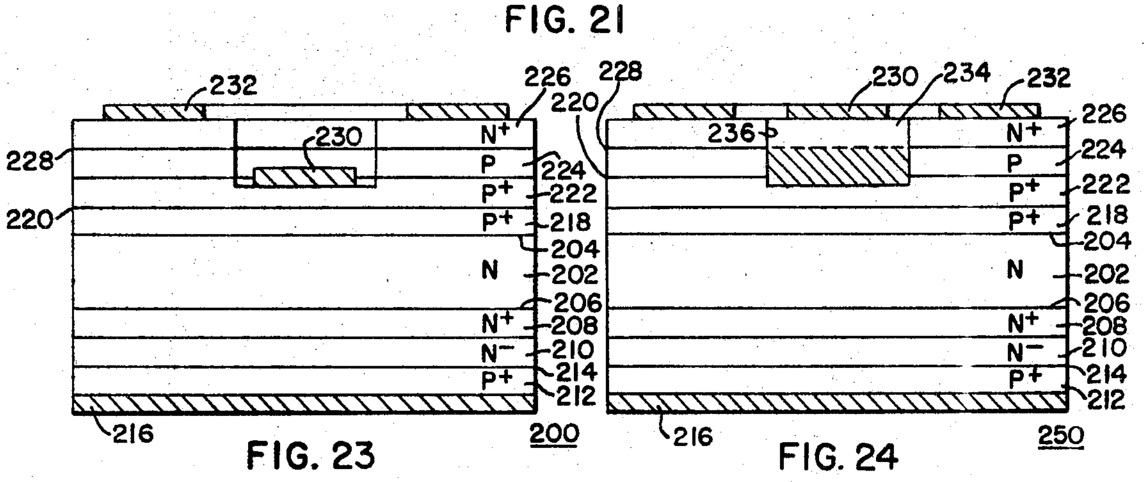
FIGS. 23 and 24 are views, partly in cross-section, of semiconductor devices made in accordance with the teachings of this invention.

Another alternate construction for a semiconductor device suitable for use as a thyristor unit and embodying the teachings of this invention is one combining the best features of the devices 50 and 100. With reference to FIG. 23 there is shown a semiconductor device 200 embodying the best features of the devices 50 and 100.

The device 200 comprises a body 202 of n-type semiconductivity semiconductor material. The resistivity and the dimensions of the body 202 are dependent upon the end use of the device 200. The body 202 has a top surface 204 and a bottom surface 206 which are two opposed major surfaces. A region 208 of $n^+$-type semiconductivity semiconductor material is disposed on the bottom surface 206 of the body 202. The region 206 has the same dimensions and the same electrical properties as the region 108 of the device 100. An epitaxially grown region 210 of $n^-$ type semiconductivity semiconductor material is disposed on the region 208. The region 210 has the same dimensions and the same electrical properties as the region 110 of the device 100. The regions 208 and 210 form a retarded electrical field in the device 200.

A region 212 of $p^+$-type semiconductivity semiconductor material is formed on the region 210, the interface of the regions 208 and 210 forming a p-n junction 214. The dimensions and the electrical characteristics of the region 212 are the same as those of the region 112 of the device 100. An electrical contact 216, preferably comprising aluminum, is affixed to the region 212.

A region 218 of $p^+$-type semiconductivity semiconductor material epitaxially grown on, or diffused into the body 202 through the top surface 204, establishes a p-n junction 220 at the interface of the region 218 and the body 202. The region 218 has the same dimensions, the same electrical characteristics and the same impurity concentration profile as the region 58 of the device 50.

A region 222 of epitaxially grown $p^+$-type semiconductivity semiconductor material is grown on the region 218. The region 222 has the same dimensions, the same electrical characteristics, and the same impurity profile as the region 66 of the device 50.

An epitaxially grown region 224 of $p^-$-type semiconductor material is disposed on the region 222. The region 224 has the same dimensions, the same electrical characteristics, and the same purity profile as the region 68 of the device 50.

The two epitaxially grown regions 222 and 224 retard the flow of the electrons in this portion of the device 200 during its operational activity.

A region 226 of $n^+$-type semiconductivity is disposed on the region 224 and the coextensive surfaces of the regions 224 and 226 established a p-n junction 228. The region 226 has the same dimensions, the same electrical characteristics, and the same impurity profile as the region 70 of the device 50. Electrical contacts 230 and 232, preferably comprising aluminum, are affixed directly to the respective regions 222 and 226.

Referring now to FIG. 24 there is shown a semiconductor device 250 embodying the teachings of this invention but having an alternate configuration of the device 200. In this instance all the features are the same except that the electrical contact 230 is affixed to a recrystallized region of p-type semiconductivity which extends through the regions 226, 224 and into the region 222. The region 234 may be formed by alloying. P-n junction 236 is formed between regions 226 and 234.

Figure 25:
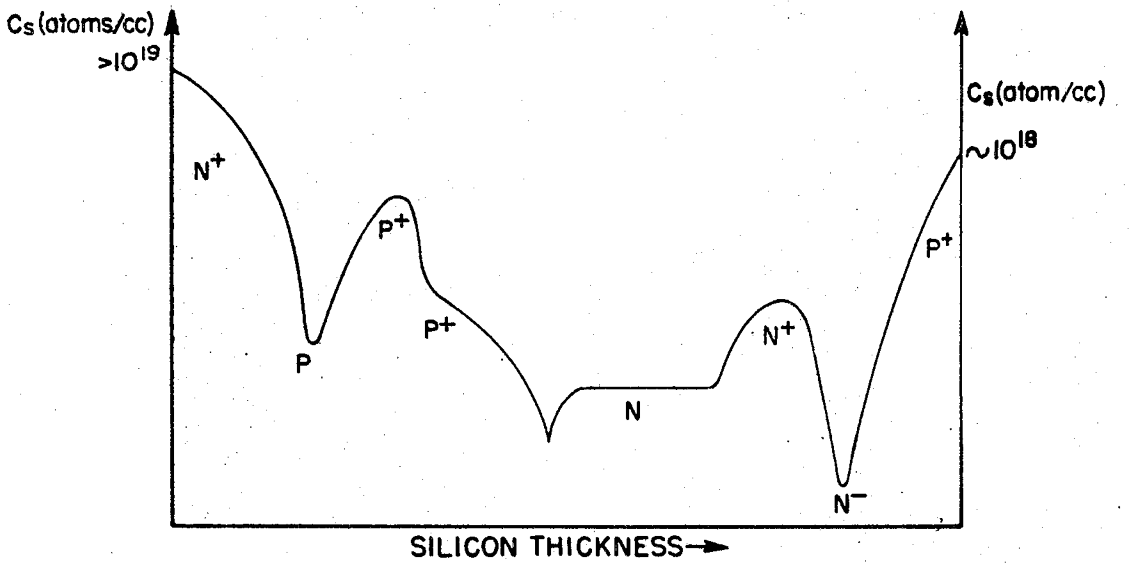
FIG. 25 is an impurity concentration profile of the semiconductor devices of FIGS. 22 and 23.

The impurity concentration profile for each of the devices 200 and 250 is the same and is shown in FIG. 25.

Semiconductor units manufactured in accordance with the teachings of this invention have satisfactorily performed the combined desirable features of both all diffused and alloy diffused thyristor units. Additionally, the process methods employed have increased considerably the yield of acceptable units per manufacturing run.

While the invention has been described with particular reference to specific embodiments and examples of the invention, it will be understood, of course, that modifications, substitutions, and the like may be made therein without departing from its scope.

I claim as my invention:

1. A drift field thyristor comprising:

(1) a body of semiconductor material having a top surface, a bottom surface, and four semiconductive regions of alternate semiconductivity type with p-n junctions therebetween including, in sequence from the top surface, a first emitter region, a first base region, a second base region, and a second emitter region;

(2) an ohmic electrical contact affixed to each of said first emitter, said first base, and said second emitter regions; and (3) said first base region comprising at least two different portions, each portion having a graded level of impurity concentration, the first portion abutting the first emitter region whereby the p-n junction is formed therebetween and having a decreasing level of impurity concentration with increasing distance from the p-n junction whereby during normal operation of the thyristor electron flow is accelerated through the first portion, and the second portion abutting the second base region whereby the p-n junction between the two base regions is formed therebetween and having an increasing level of impurity concentration with increasing distance from the p-n junction which reaches a maximum value at least one order of magnitude greater than the maximum value of the level of impurity concentration of the first portion at an intermediate point and a decreasing level of impurity concentration with further increasing distance the p-n junction whereby in normal operation the electron flow is retarded in that part of the second portion having a decreasing level of impurity concentration.

2. The drift field thyristor of claim 1 in which said first base region has a third portion disposed between and abutting said first and said second portions and having a graded level of impurity concentration which increases with increasing distance from either of the abutting first and second portions and reaches a maximum value at least an order of magnitude greater than either one of the impurity concentration levels of said first and said second portions.

3. The drift field thyristor of claim 1 in which:

(1) said first emitter region has a surface concentration greater than $10^{19}$ atoms per cubic centimeter and a thickness of from 5 to 20 microns;

(2) said first portion of said first base region has a surface concentration of approximately $2.5 \times 10^{15}$ atoms per cubic centimeter, a resistivity of less than 12 ohm-centimeter, and a thickness of from 2 to 10 microns; and said second portion of said first base region has a surface concentration of approximately $10^{18}$ atoms per cubic centimeter and a thickness of from 2 to 4 mils;

(3) said second base region has a resistivity of from 15 to 200 ohm-centimeter; and (4) said second emitter region has a surface concentration of approximately $10^{18}$ atoms per cubic centimeter and a thickness of from 2 to 4 mils.

4. The drift field thyristor of claim 3 in which:

(1) said first emitter region has a thickness of from 10 to 12 microns;

(2) said first portion of said first base region has a resistivity not greater than 10 ohm-centimeter and a thickness of 5 microns; and (3) said second base region has a resistivity of 120 ohm-centimeter.

5. The drift field thyristor of claim 2 in which:

(1) said first emitter region has a surface concentration greater than $10^{19}$ atoms per cubic centimeter and a thickness of from 2 to 15 microns;

(2) said first portion of said first base region has a surface concentration of approximately $2.5 \times 10^{15}$ atoms per cubic centimeter, a resistivity of not greater than 10 ohm-centimeter, and a thickness of from 2 to 10 microns;

said second portion of said first base region has a surface concentration of approximately $10^{18}$ atoms per cubic centimeter and a thickness of from 2 to 4 mils; and said third portion of said first base region has a surface concentration of from $8\times10^{15}$ atoms per cubic centimeter to $10^{19}$ atoms per cubic centimeter and a thickness of from 2 to 5 microns; and (3) said second emitter region has a surface concentration of approximately $10^{18}$ atoms per cubic centimeter and a thickness of from 2 to 4 mils.

6. The drift field thyristor of claim 5 in which:

(1) said first emitter region has a thickness of from 10 to 15 microns;

(2) said first portion of said first base region having a thickness of 5 microns; and said second portion of said first base region has a thickness of 3.5 mils; and (3) said second emitter has a thickness of 3.5 mils.

7. The drift field thyristor of claim 3 in which:

(1) said first emitter region has a surface concentration greater than $10^{19}$ atoms per cubic centimeter and a thickness of from 10 to 15 microns;

(2) said first base region has a surface concentration of approximately $10^{18}$ atoms per cubic centimeter and a thickness of from 2 to 3 mils;

(3) said first portion of said second base region has a surface concentration of approximately $10^{13}$ atoms per cubic centimeter and a thickness of from 2 to 10 microns; and said second portion of said second base region has a surface concentration of less than $10^{15}$ atoms per cubic centimeter; and (4) said second emitter region having a surface concentration of approximately $10^{18}$ atoms per cubic centimeter and a thickness of from 2 to 3 mils.

8. The controlled rectifier of claim 9 in which:

(1) said first portion of said second base region having a thickness of 5 microns; and (2) said second portion of said second base region having a surface concentration of less than $10^{14}$ atoms atoms per cubic centimeter.

9. The drift field thyristor of claim 8 in which:

(1) said first emitter region has a surface concentration of greater than $10^{19}$ atoms per cubic centimeter and a thickness of from 5 to 20 microns;

(2) said first portion of said second base region has a surface concentration of approximately $10^{13}$ atoms per cubic centimeter and a thickness of from 2 to 10 microns; and said second portion of said second base region has a surface concentration of less than $10^{15}$ atoms per cubic centimeter; and (3) said first portion of said first base region having a surface concentration of approximately $2.5\times10^{15}$ atoms per cubic centimeter, a resistivity of less than 12 ohm-centimeter, and a thickness of from 2 to 10 microns; and said second portion of said first base region has a surface concentration of approximately $10^{18}$ atoms per cubic centimeter and a thickness of from 2 to 4 mils; and (4) said second emitter region has a surface concentration of approximately $10^{18}$ atoms per cubic centimeter and a thickness of from 2 to 3 mils.

10. The drift field thyristor of claim 9 in which:

(1) said first emitter region has a thickness of from 10 to 12 microns;

(2) said first portion of said second base region has a thickness of 5 microns;

(3) said first portion of said first base region has a resistivity of less than 10 ohm-centimeter.

11. The drift field thyristor of claim 2 in which:

(1) said first emitter region has a surface concentration of greater than $10^{19}$ atoms per cubic centimeter and a thickness of from 2 to 15 microns;

(2) said first portion of said first base region has a surface concentration of approximately $2.5\times10^{15}$ atoms per cubic centimeter, a resistivity not exceeding 10-ohm-centimeter, and a thickness of from 2 to 10 microns;

said second portion of said first base region has a surface concentration of approximately $10^{18}$ atoms per cubic centimeter and a thickness of from 2 to 4 mils;

said third portion of said first base region has a surface concentration of from $8\times10^{15}$ to $10^{19}$ atoms per cubic centimeter and a thickness of from 2 to 5 microns;

said first portion of said second base region having a surface concentration of approximately $10^{13}$ atoms per cubic centimeter and a thickness of from 2 to 10 microns; and said second portion of said second base region having a surface concentration of less than $10^{15}$ atoms per cubic centimeter; and (3) said second emitter region having a surface concentration of approximately $10^{18}$ atoms per cubic centimeter and a thickness of from 2 to 3 mils.

12. The drift field thyristor of claim 11 in which:

(1) said first emitter region has a thickness of from 10 to 15 microns;

(2) said first portion of said first base region has a thickness of 5 microns;

(3) said second portion of said first base region has a thickness of 3.5 mils;

(4) said first portion of said second base region has a thickness of 5 microns; and (5) said second portion of said second base region has a surface concentration of less than $10^{14}$ atoms per cubic centimeter.

13. The drift field thyristor of claim 5 in which said first and said third portions of said first base region each comprise an epitaxial layer of semiconductor material.

14. The drift field thyristor of claim 7 in which said first and said second base regions each comprise an epitaxial layer of semiconductor material.

15. The drift field thyristor of claim 9 in which said first and said third portions of said first base region each comprise an epitaxial layer of semiconductor material.

16. The drift field thyristor of claim 11 in which said first and said third portions of said first base region each comprise an epitaxial layer of semiconductor material.

17. The drift field thyristor of claim 1 in which the ohmic electrical contact to the first base region is affixed to the second portion of the first base region.

18. The drift field thyristor of claim 2 in which said second base region comprises at least three different portions, each portion having a different maximum value of level of impurity concentration, the first portion abutting the second emitter region whereby the p-n junction is formed between the second emitter and second base regions and also abutting the second portion, the second portion abutting the first and the third portions, and the third portion abutting the second portion and the second portion of the first base region whereby the p-n junction is formed between the two base regions, the first portion having a graded level of impurity concentration which decreases in value with increasing distance from either one of the abutting second emitter region and the second portion to reach a minimum value for the level of impurity concentration within the first portion, and the second portion having a graded level of impurity concentration which increases with increasing distance from either one of the abutting first and third portions to a maximum value at least one order of magnitude greater than the minimum value of said first portion.

19. The drift field thyristor of claim 20 in which said first base region has a third portion disposed between and abutting said first and said second portions and having a graded level of impurity concentration which increases with increasing distance from either of the abutting first and second portions and reaches a maximum value at least one order of magnitude greater than either one of the impurity concentration levels of said first and said second portions.

20. The drift field thyristor of claim 18 in which the third portion of the second base region has essentially a constant uniform level of impurity concentration the value of which is less than the maximum value of the second portion but greater than that of the first portion.

21. A drift field thyristor comprising:

(1) a body of semiconductor material having a top surface, a bottom surface, and four semiconductor regions of alternate semiconductivity type with p-n junctions therebetween including, in sequence from the top surface, a first emitter region, a first base region, a second base region, and a second emitter region;

(2) an ohmic electrical contact affixed to each of said first emitter, said first base, and said second emitter regions;

(3) said first base region having a graded level of impurity concentration, the impurity concentration increasing with increasing distance from the p-n junctions between the first base region and the respective first emitter and second base regions to reach a maximum value within the first base region whereby during normal operation of the thyristor electron flow through that portion of the first base region immediately adjacent to the first emitter region is retarded; and (4) said second base region comprises at least three different portions, each portion having a different maximum value of level of impurity concentration, the first portion abutting the second emitter region whereby the p-n junction is formed between the second emitter and second base regions and also abutting the second portion, the second portion in between and abutting the first and the third portions, and the third portion abutting the second portion and the second portion of the first base region whereby the p-n junction is formed between the two base regions, the first portion having a graded level of impurity concentration which decreases in value with increasing distance from either one of the abutting second emitter region and the second portion to reach a minimum value for the level of impurity concentration within the first portion, and the second portion having a graded level of impurity concentration which increases with increasing distance from either one of the abutting first and third portions to a maximum value at least one order of magnitude greater than the minimum value of said first portion.

22. The drift field thyristor of claim 21 in which the third portion of the second base region has essentially a constant uniform level of impurity concentration the value of which is less than the maximum value of the second portion but greater than that of the first portion.

23. A drift field thyristor comprising:

(1) a body of semiconductor material having a top surface, a bottom surface, and four semiconductive regions of alternate semiconductivity type with p-n junctions therebetween including, in sequence from the top surface, a first emitter region, a first base region, a second base region, and a second emitter region;

(2) an ohmic electrical contact affixed to each of said first emitter, said first base, and said second emitter region; and (3) said first base region having a graded level of impurity concentration wherein the level of impurity concentration increases with increasing distance from both the p-n junction between the first base and first emitter regions and the p-n junction between both base regions and reaches a maximum value at a point intermediate of the p-n junctions whereby in normal operation the electron flow is retarded in that part of the first base region adjacent to the first emitter region.

References Cited

UNITED STATES PATENTS

| | | | |
|---|---|---|---|
| 3,270,293 | 9/1969 | De Looch et al. | 331—107 |
| 3,040,219 | 6/1962 | Fulop | 317—235 |
| 3,422,322 | 1/1969 | Haisty | 317—235 |
| 3,463,972 | 9/1969 | Lauritzen | 317—235 |
| 3,059,123 | 10/1962 | Pfann | 307—88.5 |
| 2,899,652 | 9/1959 | Read | 333—80 |
| 2,981,874 | 4/1961 | Rutz | 317—235 |
| 3,074,826 | 1/1963 | Tummers | 148—1.5 |
| 3,411,054 | 11/1968 | Cullis | 317—235 |
| 3,231,796 | 1/1966 | Shombert | 317—235 |

JOHN W. HUCKERT, Primary Examiner

MARTIN H. EDLOW, Assistant Examiner

U.S. Cl. X.R.

307—305